US006848673B1

(12) United States Patent
McLaughlin, Sr. et al.

(10) Patent No.: US 6,848,673 B1
(45) Date of Patent: Feb. 1, 2005

(54) JACK ASSEMBLY WITH LIFTING HANDLE

(75) Inventors: Thomas H. McLaughlin, Sr., Geneva, IL (US); Richard Brown, Elgin, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 0 days.

(21) Appl. No.: 10/670,988

(22) Filed: Sep. 25, 2003

(51) Int. Cl.[7] .................................................. B60P 1/48
(52) U.S. Cl. .................................. 254/8 B; 254/DIG. 3
(58) Field of Search ........................... 254/8 B, DIG. 3, 254/2 B, 93 R, 89 H, 131, 120, DIG. 4, 124, 7 B, 10 B, DIG. 1

(56) References Cited

U.S. PATENT DOCUMENTS

| | | | | | |
|---|---|---|---|---|---|
| 5,419,534 | A | * | 5/1995 | Vesely | 254/9 C |
| 6,295,812 | B1 | * | 10/2001 | Hsu | 60/482 |
| 6,416,039 | B1 | * | 7/2002 | Pietrusynski | 254/8 B |
| 6,435,477 | B2 | * | 8/2002 | Brunnhoelzl | 254/8 B |
| 6,505,816 | B1 | | 1/2003 | Hung | |
| 2004/0065871 | A1 | * | 4/2004 | Hsu | 254/8 B |

OTHER PUBLICATIONS

Printed website pages from http://www.samsclub.com/eclub/main_shopping.jsp?coe=0&oidPath=0%3a–23542%3a–2 . . . , printed Jun. 19, 2003, U.S.A.

Printed website pages from http://graphics.samsclub.com/images/products/0070030534600_L4.jpg, printed Jun. 19, 2003, U.S.A.

Printed website pages from http://graphics.samsclub.com/images/products/0000843512406_L4.jpg, printed Jun. 19, 2003, U.S.A.

SEARS newspaper advertisement, printed May 2003, U.S.A.

* cited by examiner

*Primary Examiner*—Lee D. Wilson
(74) *Attorney, Agent, or Firm*—Michael Best & Friedrich LLP

(57) ABSTRACT

A jack assembly with a lifting handle is disclosed. The jack assembly includes a frame having a pair of elongated side members that are in spaced-apart relation, each having a first end and a second end. A first rolling member is positioned at or near the first ends of the side members. The frame further includes at least one positioning handle fixed to a side member intermediate the first and second ends and having a grasping portion spaced from the respective side member. The jack assembly also includes a lifting handle fixed to the frame and connected between either the respective first ends of the side members or the respective second ends of the side members. The position and configuration of the lifting handle enable a user to lift and carry the jack assembly with a single hand, without causing twisting of the user's hand and wrist.

16 Claims, 3 Drawing Sheets

JACK ASSEMBLY WITH LIFTING HANDLE

TECHNICAL FIELD

The invention relates to a jack assembly with a handle for lifting and carrying the jack assembly.

BACKGROUND OF THE INVENTION

A variety of jacks are known that allow a user to lift an object, such as a vehicle, off the ground for maintenance and other tasks requiring either access to the underside of the vehicle or release of the vehicle's weight from its wheels or other supporting structure. Jacks of different sizes, weights, actuating systems, and positioning features are known to accommodate various lifting applications.

Developments in materials and construction have allowed jacks to have a lower total weight. For example, jacks weighing less than sixty pounds, made of mostly aluminum, and rated for up to and exceeding two tons, have become popular for their convenience and capabilities, and can be readily lifted and carried by the user. While light enough to be lifted and carried, these prior art jacks can be awkward to lift and/or carry due to the combination of the weight distribution of the jack and the location and design of the carrying handles. Often, the placement of the handles causes substantial twisting and stress on the user's hand and wrist as the user attempts to compensate for the uneven weight distribution experienced while carrying the jack. It would thus be desirable to provide a jack with an ergonomically positioned handle to allow an individual to comfortably lift and carry the jack.

SUMMARY OF THE INVENTION

In particular, in one embodiment, the invention provides a jack assembly comprising an elevating subassembly movable between an extended position and a retracted position. The jack assembly also includes a frame having a pair of elongated, generally planar side members supporting the elevating subassembly. The side members are in spaced-apart relation, each having a first end, a second end, and a body portion extending between the ends. Each side member includes an inner surface facing the elevating subassembly and extending along the length of the side member. Each side member further includes an outer surface in opposite facing relation to the inner surface and extending along the length of the side member. The jack assembly further includes a rolling member adjacent the first ends of the side members. At least one positioning handle is fixed to the outer surface of one of the side members at a location intermediate the first and second ends. The positioning handle includes a grasping portion spaced from the outer surface of the side member and extending along a portion of the length of the side member. The jack assembly also includes a lifting handle fixed to the frame and connected between either the respective first ends of the side members or the respective second ends of the side members.

In one aspect of the invention, the jack assembly defines a center of gravity aligned with a longitudinal axis of the jack assembly. The lifting handle includes a grasping portion having a midpoint, and the midpoint is also aligned with the longitudinal axis. The lifting handle is therefore configured and positioned to enable a user to lift and carry the jack assembly with a single hand, without causing twisting of the user's hand and wrist. Preferably, the jack assembly weighs less than about 60 pounds.

The invention also provides a method of lifting and carrying a jack having a generally rectangular frame with opposed, spaced-apart elongated sides and opposed, spaced-apart shorter sides. One of the shorter sides includes a lifting handle and the other of the shorter sides including a rolling member. The method includes grasping the lifting handle with a single hand, lifting the jack assembly via the lifting handle such that the other of the shorter sides rolls toward the user along a supporting surface via the rolling member, lifting the jack assembly such that the rolling member loses contact with the supporting surface, and carrying the jack assembly such that the elongated sides are oriented generally vertically with respect to the support surface and such that the user's hand and wrist experience substantially no twisting.

In one aspect, the lifting handle includes a midpoint generally aligned with a center of gravity of the jack assembly, and grasping the lifting handle with a single hand includes grasping the lifting handle generally at the midpoint such that when carrying the jack assembly, the center of gravity is aligned with and below the user's hand.

Other features and advantages of the invention are set forth in the drawings and detailed description of the invention.

Figure 1:
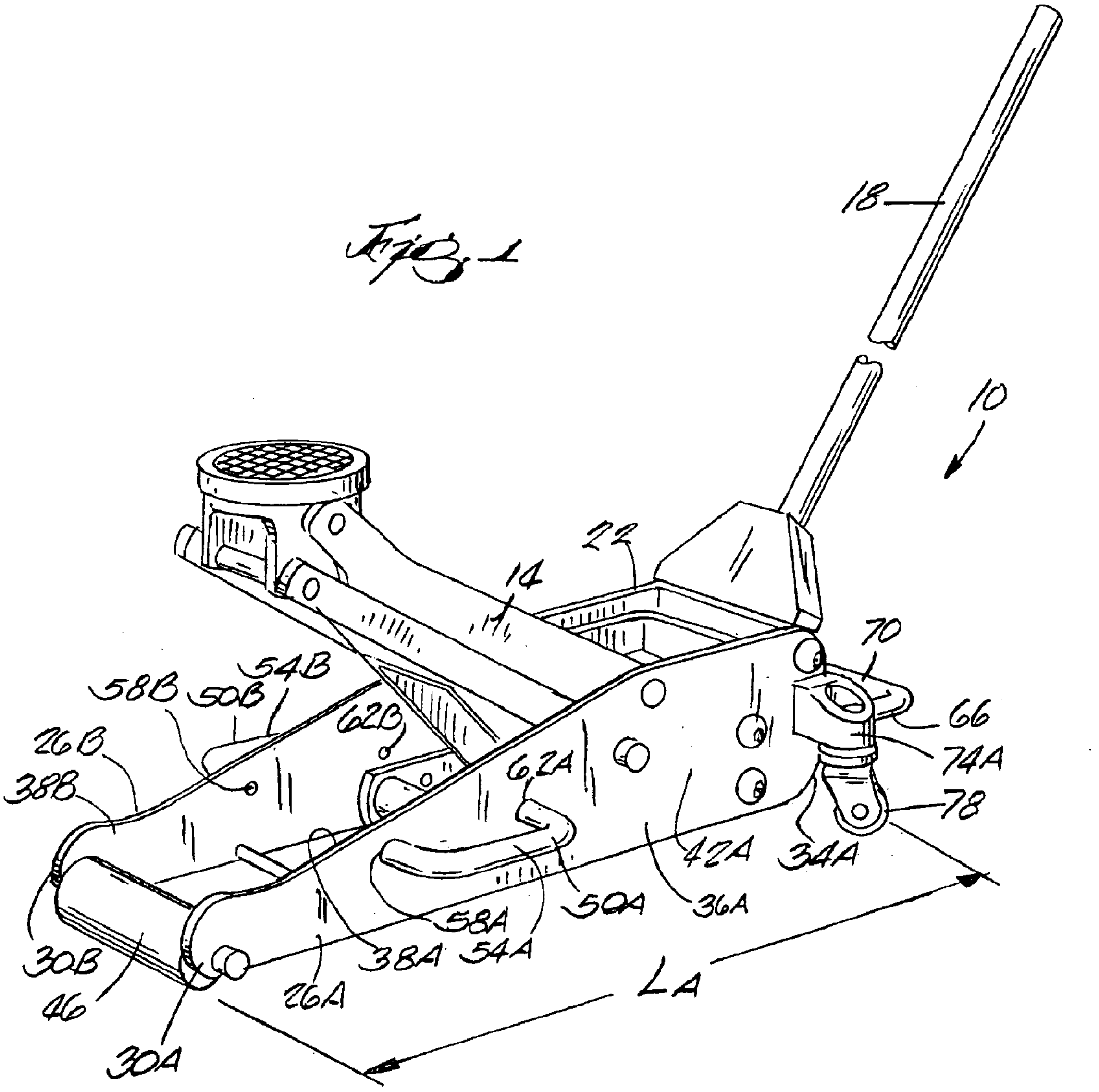
FIG. 1 is a front perspective view of a jack assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items.

DETAILED DESCRIPTION

Figure 2:
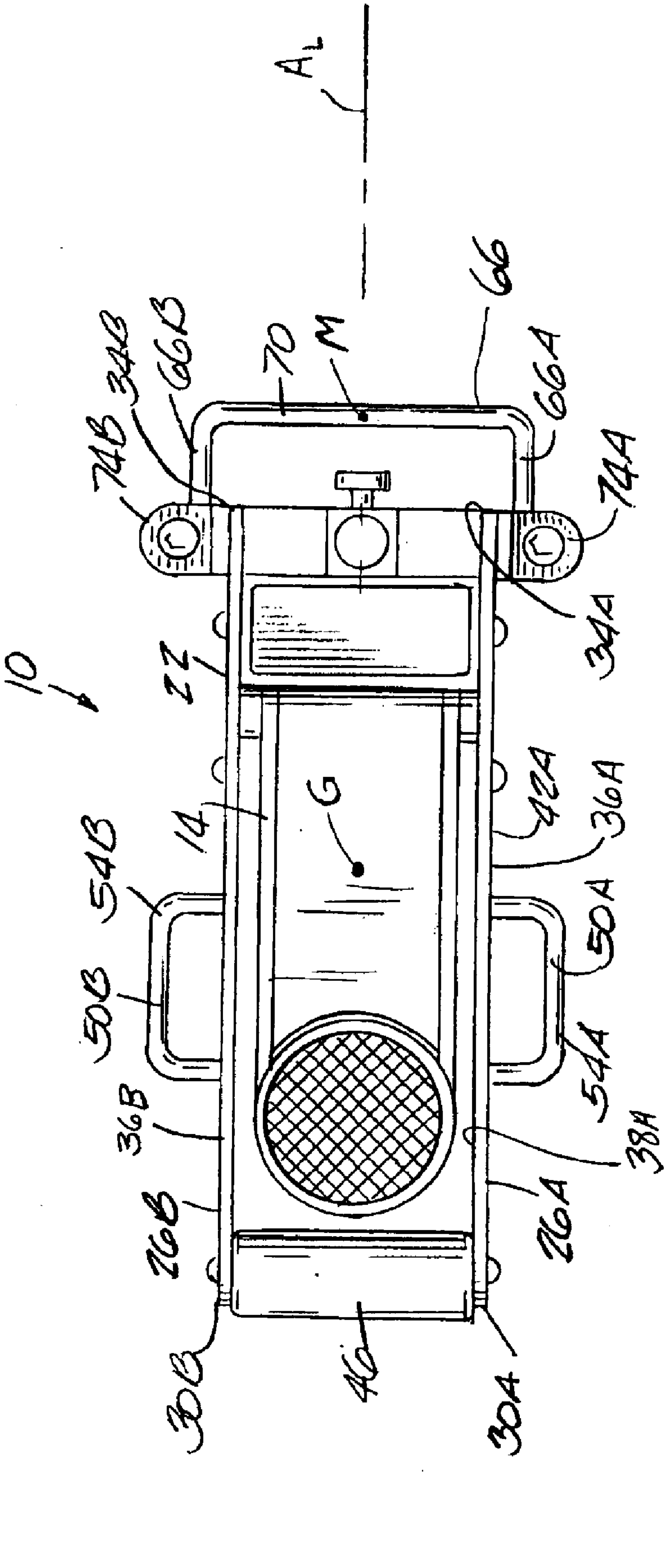
FIG. 2 is a top view of the jack assembly shown in FIG. 1.

Referring to FIGS. 1 and 2, the jack assembly 10 includes an elevating subassembly 14 that extends (i.e., raises) and retracts (i.e., lowers) during operation of the jack assembly 10 to lift a vehicle or other item (not shown). The illustrated jack assembly 10 is made primarily from aluminum, has a lifting capacity of at least 2,000 pounds, and weighs less than about 60 pounds such that a user can lift and carry the jack assembly 10 with a single hand. It is understood that in other embodiments, the jack assembly 10 may include steel or any other appropriate metal that provides a strong, yet lightweight, jack assembly. The jack assembly 10 further includes an actuating lever 18 removably attached to the elevating subassembly 14. A user's manipulation of the actuating lever 18 causes the elevating subassembly 14 to extend and retract during use.

The jack assembly 10 also includes a frame 22 having a pair of generally planar side members 26A, 26B. The side members 26A, 26B are substantially identical to each other and thus only the first side member 26A will be described in detail below. Like parts on the second side member 26B are given like reference numerals designated with a "B." The side member 26A has a first end 30A, a second end 34A, and a body portion 36A extending therebetween. The side member 26A has a length LA. The side member 26A further includes an inner surface 38A facing the elevating subassembly 14 and an outer surface 42A opposite the inner surface 38A. The inner surface 38A and outer surface 42A extend the length LA of the side member 26A.

The jack assembly 10 further includes a rolling member 46 that extends between and is connected to both side members 26A, 26B at or near the first ends 30A, 30B. The rolling member 46 shown is a cylinder-type roller, however, it is understood that in other embodiments the rolling member 46 can include one or more wheels, casters, roller balls or other equivalents. Additionally the rolling member 46 need not connect to both side members 26A, 26B nor extend between both side members 26A, 26B. For example, in another embodiment (not shown), two rolling members exist, each rolling member connected to the outer surface 42A, 42B of a respective side member 26A, 26B at or near the first ends 30A, 30B.

The jack assembly 10 also includes a pair of positioning handles 50A, 50B fixed directly to the outer surfaces 42A, 42B of respective side members 26A, 26B. One positioning handle 50A is attached between the first end 30A and the second end 34A of the side member 26A. The positioning handle 50A shown is generally "U" shaped and includes a grasping portion 54A. However, it is understood that in other embodiments, an "L" shaped handle or any other equivalent handle configuration having any number of connection points to the side member 26A could be used. The positioning handle 50B is similarly attached to the second side member 26B. It is understood that in other embodiments (not shown), the jack assembly 10 might include only a single positioning handle fixed to the frame 22.

A lifting handle 66 is also connected to the frame 22 and includes a grasping portion 70 connected between two mounts 74A, 74B via respective handle arm portions 66A, 66B. The lifting handle 66 is substantially "U" shaped, however, it is understood that in other embodiments (not shown), the lifting handle could have an "L" shape or any other equivalent handle configuration to allow a user to grasp the handle and could be connected to only one side member 26A or 26B. The mounts 74A, 74B are each connected to a respective side member 26A, 26B at or near the second ends 34A, 34B respectively. In the illustrated embodiment, the mounts 74A, 74B are connected to the respective side members 26A, 26B with a bolt. However, it is understood that a screw, rivet, or any other mechanical fastener could be used. Alternatively, other ways of connecting the mounts 74A, 74B to the side members 26A, 26B such as welding or any other type of material bonding could be used.

Casters 78 (only one of which is shown) are connected to the respective mounts 74A, 74B to allow a user to roll the jack assembly into position with ease. However, any type of wheel, roller, roller ball or other equivalent could be used. For example, a cylinder-type roller like the roller 46 could be connected between the side members 26A, 26B, in which case, the lifting handle 66 could be connected between the side members 26A, 26B in any suitable manner.

The present invention allows a user to insert a hand at least partially between the lifting handle 66 and the remainder of the jack assembly 10 and then grasp the grasping portion 70 of the lifting handle 66 in order to lift and carry the jack assembly 10 comfortably with one hand. The roller 46 facilitates the lifting of the jack assembly 10. As the user lifts the jack assembly 10 using the lifting handle 66, the roller 46 allows the jack assembly 10 to roll along the support surface toward the user until the jack assembly 10, and more specifically the elongated side members 26A, 26B, become oriented in a substantially vertical orientation next to the user. Eventually, the roller 46 is lifted off the ground and the full weight of the jack assembly 10 is carried by the user via the lifting handle 66. The roller 46 also facilitates the smooth repositioning of the jack assembly 10 to the generally horizontal position when the user places the jack assembly 10 back on the ground.

In a carried position, the weight of the jack assembly 10 is most directly below the lifting handle 66, minimizing the twisting or stress on the user's hand and wrist. Further, the weight of the jack assembly 10 is distributed such that it is easy for the user to balance while carrying.

More specifically, the jack assembly 10 is substantially symmetrical about a longitudinal axis $A_L$, and therefore includes a center of gravity G (see FIG. 2) that lies substantially midway between the side members 26A, 26B on the longitudinal axis $A_L$. The grasping portion 70 of the lifting handle 66 includes a midpoint M that is also aligned with the longitudinal axis $A_L$. Thus, when a user grasps the grasping portion 70 substantially at the midpoint M while carrying the jack assembly 10, the user's hand is positioned directly above and in line with the center of gravity G. Therefore, no awkward twisting of the user's hand or wrist is required to correct for weight distribution or balance problems.

In contrast, one can observe from FIG. 2 how using one of the positioning handles 50A, 50B to carry the jack assembly 10 with one hand will result in an awkward twisting of the user's hand and wrist because the center of gravity G is not in line with the midpoints of either of the grasping portions 54A, 54B.

Figure 3:
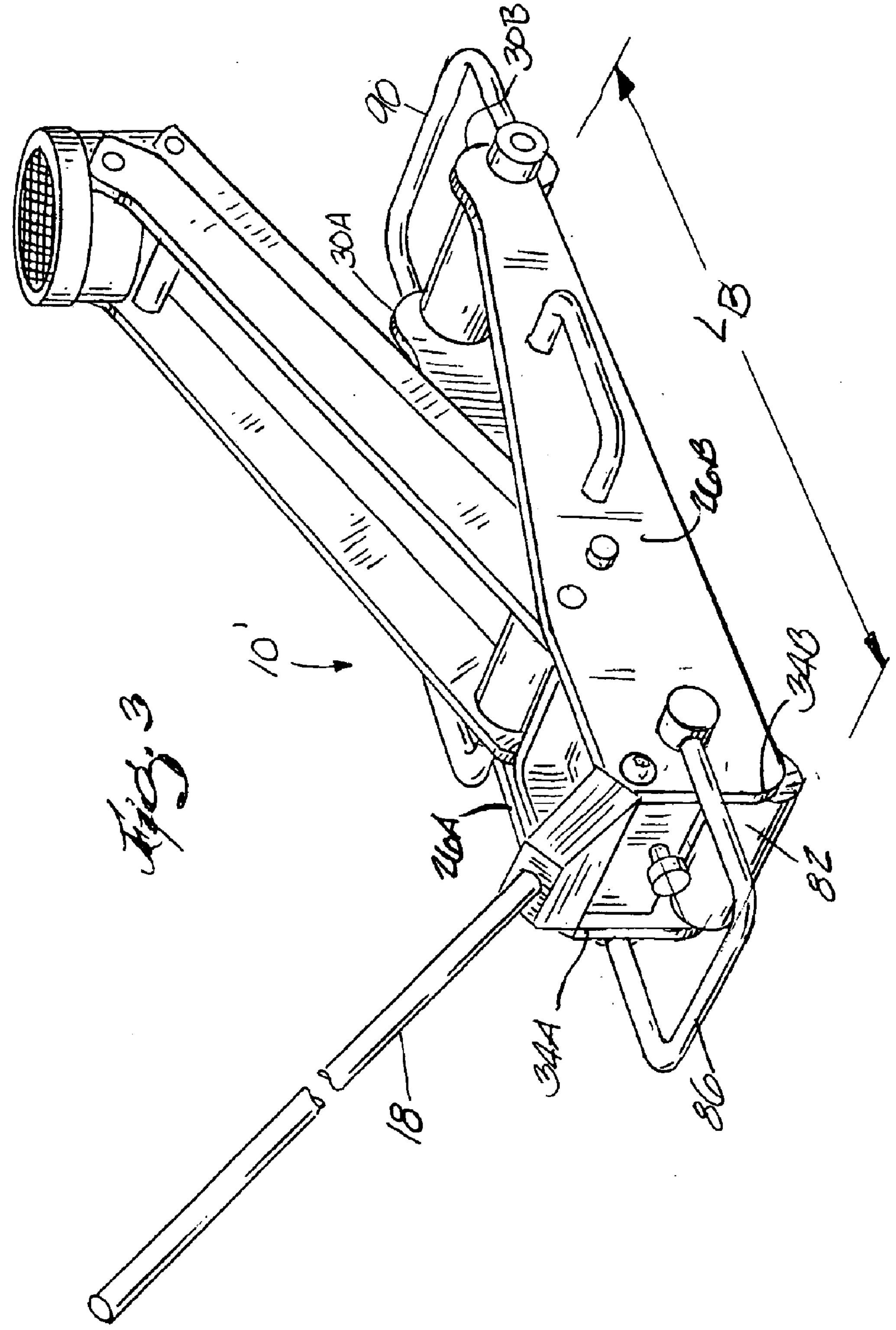
FIG. 3 is a rear perspective view of an alternative jack assembly embodying the invention.

FIG. 3 illustrates a jack assembly 10' of another embodiment of the present invention. Like parts have been given like reference numerals. The jack assembly 10' includes a rolling member 82 connected between the side members 26A, 26B at or near the second ends 34A, 34B. The rolling member 82 shown is a cylinder-type roller, however, one or more wheels, casters, roller balls or other equivalents could be used.

A lifting handle 86 is connected directly to the outer surfaces 42A, 42B of the side members 26A, 26B and extends at least partially therebetween. In other embodiments (not shown), the lifting handle can take the form of a rod or similar member that extends between and connects to the inside surfaces of the side members. In these embodiments, the side members are spaced apart by a distance sufficient to allow a user to insert a hand at least partially between the side members and grasp the rod in order to lift the jack assembly.

FIG. 3 also illustrates a second lifting handle 90 connected to the side members 26A, 26B adjacent the first ends 30A, 30B. It is understood that in other embodiments, the jack assembly 10' need not include the first lifting handle 86, and can include only the second lifting handle 90, or vice versa.

The illustrated jack assemblies 10, 10' can both be described as having generally rectangular frames 22 defined by opposed, spaced-apart elongated sides (side members 26A, 26B) and opposed, spaced-apart shorter sides (respective ends 30A, 30B and 34A, 34B and any intervening structure). Each jack assembly 10, 10' includes a lifting handle on at least one of the shorter sides of the frame. The lifting handle enables the user to lift and carry the jack assembly 10, 10' comfortably with a single hand. The jack assemblies 10, 10' may further include one or more positioning handles on the elongated sides and oriented generally at right angles to the at least one lifting handle. While the positioning handles facilitate maneuvering the jack assemblies 10, 10' into position underneath the vehicle to be lifted, the positioning handles do not provide the comfortable lifting and carrying capability provided by the lifting handles.

Various features of the invention are set forth in the following claims.

We claim:

1. A jack assembly comprising:

an elevating subassembly movable between an extended position and a retracted position;

a frame supporting the elevating subassembly and including a pair of elongated, generally planar side members, the pair of side members being in spaced-apart relation, each of the side members having a first end, a second end, and a body portion extending between the first end and the second end, each side member having an inner surface facing the elevating subassembly and extending along the length of the side member and an outer surface in opposite facing relation to the inner surface and extending along the length of the side member;

a rolling member at or near the first ends of the side members;

at least one positioning handle fixed to the outer surface of one of the side members at a location intermediate the first and second ends, the positioning handle having a grasping portion spaced from the outer surface of the side member and extending along a portion of the length of the side member; and a lifting handle fixed to the frame and connected between either the respective first ends of the side members or the respective second ends of the side members;

wherein the jack assembly defines a center of gravity aligned with a longitudinal axis of the jack assembly, and wherein the lifting handle includes a grasping portion having a midpoint, the midpoint also being aligned with the longitudinal axis.

2. The jack assembly of claim 1, wherein the jack assembly is capable of lifting at least 2,000 pounds and weighs less than about 60 pounds.

3. The jack assembly of claim 1, wherein the lifting handle is rigidly fixed to the frame and is generally "U" shaped.

4. The jack assembly of claim 1, wherein the lifting handle is connected to the frame at or near the rolling member.

5. The jack assembly of claim 1, further comprising a second lifting handle opposite the first lifting handle and connected between the other of the respective first ends of the side members or the respective second ends of the side members.

6. The jack assembly of claim 1, further comprising a second rolling member at or near the second ends of the side members.

7. The jack assembly of claim 1, wherein the lifting handle is configured and positioned to enable a user to lift and carry the jack assembly with a single hand, without causing twisting of the user's hand and wrist.

8. The jack assembly of claim 7, wherein the jack assembly weighs less than about 60 pounds.

9. The jack assembly of claim 1, wherein the lifting handle is connected to the side members via first and second mounts, and wherein each of the mounts supports a caster to facilitate rolling movement of the jack assembly.

10. A jack assembly comprising:

an elevating subassembly movable between an extended position and a retracted position;

a frame supporting the elevating subassembly and including a pair of elongated, generally planar side members, the pair of side members being in spaced-apart relation, each of the side members having a first end, a second end, and a body portion extending between the first end and the second end, each side member having an inner surface facing the elevating subassembly and extending along the length of the side member and an outer surface in opposite facing relation to the inner surface and extending along the length of the side member;

an actuating arm removably connected to the elevating subassembly between the side members;

a first rolling member connected between the respective first ends of the side members;

a first lifting handle including a mount fixed to the frame and a grasping portion connected to the mount to extend at least partially between the first and second side members, the mount connected to the outer surface of one of the side members at or near the second end;

a second lifting handle opposite the first lifting handle and connected between the respective first ends of the side members:

a second rolling member connected to the mount to facilitate rolling movement of the jack assembly; and a pair of positioning handles, each of the handles being fixed to the outer surface of a respective side member at a location along the length of the side member and intermediate the first and second rolling members, each handle having a grasping portion spaced from the outer surface of the respective side member and extending along a portion of the length of the side member.

11. The jack assembly of claim 10, wherein the lifting handle has two mounts, each mount connected to the outer surface of respective side members at or near the second ends, the grasping portion of the lifting handle being connected between the first and second mounts.

12. The jack assembly of claim 10, wherein the jack assembly is capable of lifting at least 2,000 pounds and weighs less than 60 pounds.

13. The jack assembly of claim 10, wherein the jack assembly defines a center of gravity aligned with a longitudinal axis of the jack assembly, and wherein the grasping portion of the lifting handle has a midpoint, the midpoint also being aligned with the longitudinal axis.

14. The jack assembly of claim 10, wherein the lifting handle is configured and positioned to enable a user to lift and carry the jack assembly with a single hand, without causing twisting of the user's hand and wrist.

15. The jack assembly of claim 14, wherein the jack assembly weighs less than about 60 pounds.

16. A method of lifting and carrying a jack having a generally rectangular frame with opposed, spaced-apart elongated sides and opposed, spaced-apart shorter sides, one of the shorter sides including a lifting handle and the other of the shorter sides including a rolling member, the method comprising:

grasping the lifting handle with a single hand;

lifting the jack assembly via the lifting handle such that the other of the shorter sides rolls toward the user along a supporting surface via the rolling member;

lifting the jack assembly such that the rolling member loses contact with the supporting surface; and carrying the jack assembly such that the elongated sides are oriented generally vertically with respect to the support surface and such that the user's hand and wrist experience substantially no twisting;

wherein the lifting handle includes a midpoint generally aligned with a center of gravity of the jack assembly and wherein grasping the lifting handle with a single hand includes grasping the lifting handle generally at the midpoint such that when carrying the jack assembly, the center of gravity is aligned with and below the user's hand.

* * * * *